United States Patent [19]

Miller

[11] Patent Number: 4,793,049

[45] Date of Patent: Dec. 27, 1988

[54] METHOD OF MANUFACTURING AND EMBODIMENT OF MEASURE

[75] Inventor: Walter Miller, Traunstein, Fed. Rep. of Germany

[73] Assignee: Dr. Johannes Heidenhain GmbH

[21] Appl. No.: 117,663

[22] Filed: Nov. 5, 1987

[30] Foreign Application Priority Data

Nov. 5, 1986 [DE] Fed. Rep. of Germany ....... 3637628

[51] Int. Cl.⁴ ............................................. B23P 11/02
[52] U.S. Cl. ................................ 29/446; 29/DIG. 35; 33/125 T; 33/488
[58] Field of Search ......... 29/446, 447, 405, DIG. 35; 33/125 T, 430, 436, 443, 488, 125 A

[56] References Cited

U.S. PATENT DOCUMENTS

| | | | |
|---|---|---|---|
| 3,084,300 | 4/1963 | Sanchez | 29/446 UX |
| 3,625,092 | 12/1971 | Hondrea et al. | 33/125 T X |
| 3,629,945 | 12/1971 | Liuzzo et al. | |
| 3,697,211 | 10/1972 | Chisholm | 29/447 X |
| 3,816,002 | 6/1974 | Wieg | |
| 4,009,917 | 3/1977 | Yonkers et al. | 29/446 X |
| 4,320,578 | 3/1982 | Ernst | 33/125 T |
| 4,492,033 | 1/1985 | Ichikawa | 33/125 T X |
| 4,530,157 | 7/1985 | Nelle | 33/125 T X |
| 4,554,741 | 11/1985 | Affa | 33/125 T X |
| 4,559,709 | 12/1985 | Oberhans | 33/125 T X |
| 4,593,471 | 6/1986 | Nelle | 33/125 T |
| 4,649,648 | 3/1987 | Nagaoka et al. | 33/125 T X |

FOREIGN PATENT DOCUMENTS

| | | |
|---|---|---|
| 2016253 | 10/1971 | Fed. Rep. of Germany . |
| 1176382 | 5/1972 | Fed. Rep. of Germany . |
| 7513496 | 9/1975 | Fed. Rep. of Germany . |
| 3419527 | 11/1985 | Fed. Rep. of Germany . |
| 738225 | 10/1955 | United Kingdom ................. 29/446 |
| 1364089 | 8/1974 | United Kingdom ................. 29/446 |

*Primary Examiner*—Charlie T. Moon
*Attorney, Agent, or Firm*—Toren, McGeady & Associates

[57] ABSTRACT

A method of manufacturing an embodiment of a measure including a bending resistant graduation carrier member and a base member and fastening elements for fastening the graduation member on the base member. The material of the graduation carrier member has a lower temperature coefficient than the material of the base member. The graduation carrier member is placed on the base member in a floating manner. Subsequently, the graduation carrier member and the base member are heated to a predetermined temperature. The end faces of the graduation carrier member are then fixed by means of the fastening elements to the base member in such a way that the graduation carrier member is in a compressed state when cooled to normal temperature. The graduation carrier member may also be cooled prior to mounting to a predetermined temperature and then fixed by means of the fastening elements at least at its end faces to the base member having normal temperature in such a way that the graduation carrier member is in a compressed state after warming to normal temperature.

3 Claims, 2 Drawing Sheets

METHOD OF MANUFACTURING AND EMBODIMENT OF MEASURE

BACKGROUND OF THE INVENTION

1. Field of the Invention

The present invention relates to a method of manufacturing in embodiment of a measure. The embodiment of a measure includes a bending resistant graduation carrier member and a base member and fastening elements for fastening the graduation carrier member on the base member. The graduation carrier member and the base member have different temperature expansion coefficients.

1. Description of the Prior Art

Embodiments of measure of this type are used, for example, in longitudinal measuring devices in machine tools Measurement operations cause problems in machine tools because machine, longitudinal measuring device and tool are of different materials and, therefore, rising temperature during the operation of the machine tool leads to different dimensional changes of the various components.

Since, for various reasons, the machine component and the scale and the housing for the scale will rarely be of materials having the same thermal expansion coefficient, the unavoidable temperature changes will cause different length changes, particularly of the machine component and the scale. Thus, inaccuracies of the measurements will occur which are unacceptable in view of the measurement accuracies demanded today. Most frequently combined are machine components of gray cast iron, a housing of aluminum and a scale of glass or steel The above-described problems have been known for a long time and many solutions have been suggested for reducing by means of so-called temperature compensation the errors which are due to the temperature-related dimensional changes. In the following, those suggestions are discussed in which the compensation is carried out by means of an embodiment of a measure.

German Utility Model No. 7,513,496 describes a compensating device in which, in addition to the temperature-related error, inaccuracies of the machine are compensated. A glass scale is cemented into a hollow aluminum section with a highly elastic layer being placed between the scale and the hollow section. The hollow section is fastened to the machine by means of special end pieces. The highly elastic layer serves to mechanically uncouple the glass scale from the hollow aluminum section. Thus, constraining forces cannot be transmitted from the machine to the glass scale. The compensating device acts on the end faces of the glass scale and can compress or stretch the glass scale in accordance with the requirements of the error pattern. Accordingly, the compensating device adjusts the effective length of the graduation.

The error compensation of the type described above has been found useful. In addition, the; fastening of a scale in a measuring device in a floating manner has been known at least since German Pat. No. 1,176,382. The fastening in a floating manner is now considered necessary in order to fasten the highly accurate graduation free of constraining forces. A number of other publications show that it has been considered necessary in the art to uncouple the graduation from the machine, so that no thermally related constraining forces influence the graduation. This view is expressed, for example, in German Offenlegungsschrift No. 2,016,253 and U.S. Pat. Nos. 3,816,002 and 3,629,945.

More recently, those skilled in the art have gradually changed this view and have rigidly connected embodiments of measure to machines. This more recent view is expressed, for example, in German Offenlegungsschrift No. 3,419,577. In this reference, an embodiment of measure is calibrated by means of calibrating screws at a normal temperature of, for example, 20° C. When the measuring device is mounted on the machine, initially the temperature at the mounting surface is measured. The embodiment of measure is then adjusted in accordance with the temperature of the mounting surface by means of the calibrating screws and, thus, is calibrated with respect to the machine. Subsequently, the position measuring device is rigidly mounted on the machine.

Due to the rigid fastening of the two ends of a scale on the machine, the machine as well as the scale are subjected to the same longitudinal deformation when temperature changes occur, so that temperature-related inaccuracies of measurement can no longer happen in working a workpiece. However, in the case of bending resistant scales of glass, this proposal can be used only to a relatively limited extent because, when the temperature rises significantly above the normal temperature, the base member on which the graduation carrier member is mounted expands to a greater extent than the glass scale, so that the glued connections at the end faces tear.

It is, therefore, the primary object of the present invention to provide an embodiment of a measure which carries out the temperature-related longitudinal deformations of the machine even when heated substantially above normal temperature.

SUMMARY OF THE INVENTION

In accordance with the present invention, the graduation carrier member has a smaller temperature expansion coefficient than the base member. The graduation carrier member is placed on the base member in a floating manner. Subsequently, the graduation carrier member and the base member are heated to a predetermined temperature. The end faces of the graduation carrier member are then fixed by means of the fastening elements to the base member in such a way that the graduation carrier member is in a compressed state when cooled to normal temperature.

In accordance with another embodiment of the present invention, the graduation carrier member is cooled to a predetermined temperature and is fixed by means of the fastening elements at least at its end faces to the base member having normal temperature in such a way that the graduation carrier member is in a compressed state after warming to normal temperature.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
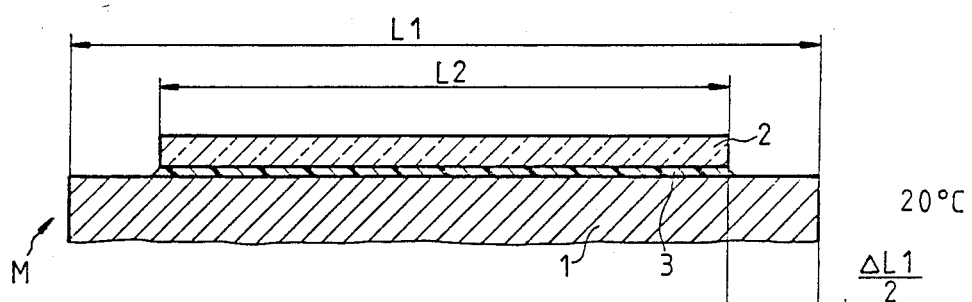
FIG. 1 is a sectional view of a base member and a graduation carrier member mounted in the initial state on the base member in a floating manner.

A base member 1 shown in FIG. 1 has placed thereon in a floating manner a bending resistant graduation carrier member 2. The floating support is realized by means of an elastic adhesive layer 3.

Base member 1 may be of steel and graduation carrier member 2 may be of glass. At a normal temperature of about 20° C., base member 1 has a length L1 and graduation carrier member 2 has a length L2.

The unit composed of base member 1 and graduation carrier member 2 is now heated to a temperature of, for example, 50° C. This final temperature is determined by the temperature range within which the machine operates on which the embodiment of measure according to the present invention is to be mounted.

As a result of the temperature increase, the dimensions of base member 1 and graduation carrier member 2 change. However, with respect to the present invention, only the longitudinal deformations are of interest.

Since the temperature coefficient of steel is greater than that of glass, base member 1 has a length of L1' at a temperature of 50° C., while the graduation carrier member has a length of L2'. In other words, the change $\Delta L1$ is unequal compared to change $\Delta L2$.

Figure 2:
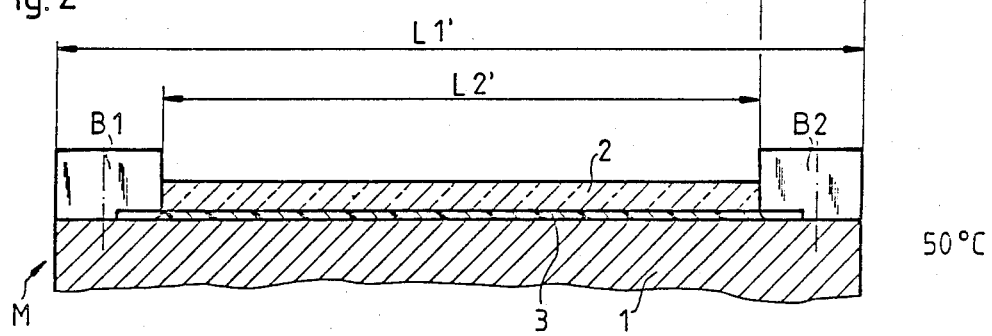
FIG. 2 is a sectional view of a heated embodiment of measure with fastening elements.
Figure 3:
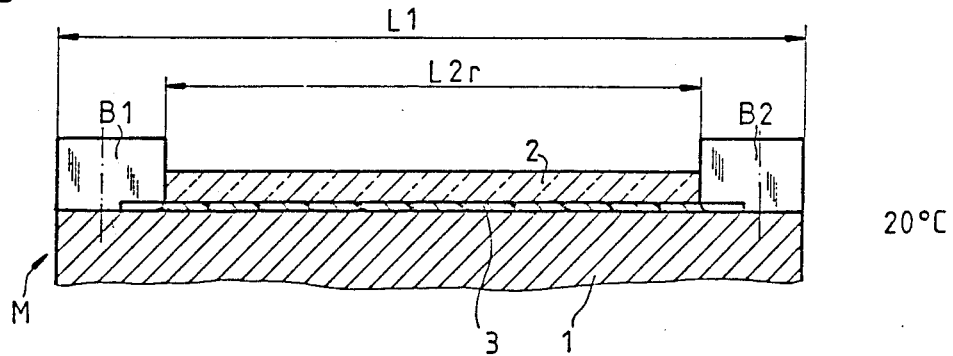
FIG. 3 is a sectional view of an embodiment of measure in the final state.

In the state illustrated in FIG. 2, carrier member 2 is fastened on base member 1 by means of fastening elements. These fastening elements may be blocks B1 and B2.

The contact surfaces of blocks B1 and B2 are constructed to exactly match the end faces of the graduation carrier member 2. Blocks B1 and B2 may be mounted on base member 1 in any chosen manner, however, the fastening must be very rigid.

After blocks B1 and B2 have been mounted, the embodiment of measure M can be completely cooled. As a result, the length of base member 1 again returns to original length L1, taking along blocks B1 and B2 which support graduation carrier member 2 between them.

During the cooling process blocks B1 and B2 compress the graduation carrier member 2 almost to the extent by which steel base member 1 expanded more in the heated state than the graduation carrier member 2 of glass. Accordingly, below the above-mentioned heating temperature, the graduation carrier member 2 is continuously under compression.

However, in order to obtain a correct graduation, not shown, the graduation marks must be mad with increased spacing between the marks. The increase in the spacing between the graduation marks depends upon the ratio of the temperature coefficients of the base member 1 and the graduation carrier 2 as will as upon the magnitude of the desired heating temperature.

Figure 4A:
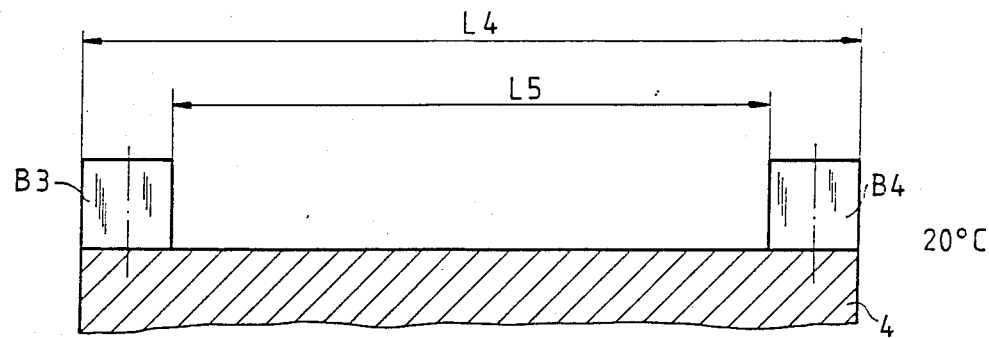
FIG. 4a is a sectional view of a base member for an embodiment of measure.

FIG. 4a of the drawing shows a base member 4 on which fastening elements B3 and B4 in the form of blocks are fixed. At a normal temperature of about 20° C., base member 4 with blocks B3 and B4 have a total length of L4. L5 denotes the inner spacing between the two blocks B3 and B4.

Figure 4B:
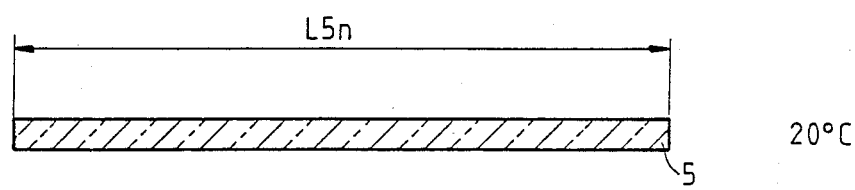
FIG. 4b is a sectional view of a graduation carrier member for an embodiment of measure.

A graduation carrier member 5 illustrated in FIG. 4b has a length of L5n at a normal temperature of about 20° C. A graduation, not shown in the drawing, placed on graduation carrier member 5 has a length which is too long by the distance which corresponds to the difference between the length L5n of graduation carrier member 5 and the inner spacing L5 between the blocks B3 and B4.

Figure 5:
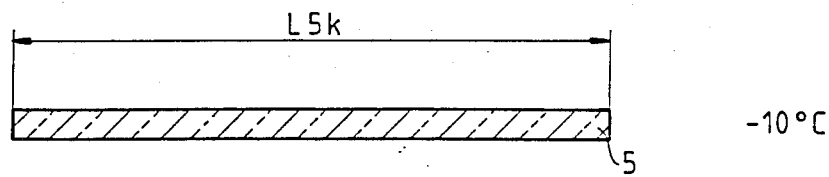
FIG. 5 is a sectional view of the graduation carrier member in the cooled state.
Figure 6:
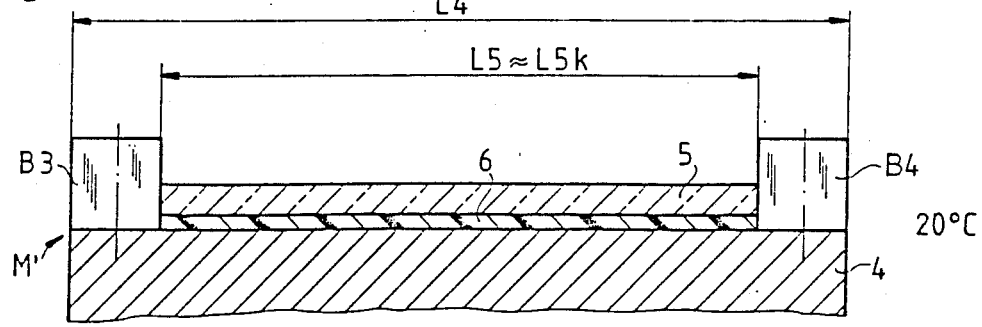
FIG. 6 is a sectional view of an embodiment of measure in the final state.

FIG. 5 of the drawing shows the same graduation carrier member 5 which is also shown in FIG. 4b. However, in FIG. 5, graduation carrier member 5 has been cooled to a temperature of about $-10°$ C. at which it has a length of L5k. This length L5k corresponds to the inner spacing L5 between blocks B3 and B4. In the cooled state, i.e., at about $-10°$ C., graduation carrier member 5 is mounted on base member 4 which has a normal temperature of about 20° C. An adhesive like layer 6 is placed between graduation carrier member 5 and base member 4.

When the graduation carrier member 5 is subsequently heated to normal temperature, graduation carrier member 5 seeks to expand to its original length of L5. However, this expansion is prevented by blocks B3 and B4 which are fixed to base member 4. Thus, at normal temperature, the graduation carrier member 5 mounted between the blocks B3 and B4 is in a compressed state.

The embodiments of measure M, M' obtained in the above-described manner can now be rigidly mounted on the mounting surfaces of the machine. At that time, the temperatures of the embodiment of measure M, M' and the temperature of the mounting surface of the machine must be the same. The material of base member 1,4 of the embodiment of measure M, M' must be adjusted with respect to its temperature coefficient to the material of the machine. When the temperature of the machine increases during operation, the dimensional change of the embodiment M, M' is the same as the dimensional change of the machine. Since the change will generally be a change in length, the graduation carrier member 2, 5 can further this change due to the internal compressive forces because of the internal compressive forces in the graduation carrier 2, 5 decrease when the machine is heated.

It is understood, of course, that the dimensions of the base member 1,4 and of blocks B1, B2, B3, B4 must be selected in such a way that the forces present within the bending resistant graduation carrier member 2, 5 will only insignificantly change the shape of the base member 1,4 and of blocks B1, B2, B3,B4.

While specific embodiments of the invention have been shown and described in detail to illustrate the application of the inventive principles, it will be understood that the invention may be embodied otherwise without departing from such principles.

I claim:

1. A method of manufacturing an embodiment of measure, including a bending resistant graduation carrier member having end faces, and a base member and fastening element for fastening the graduation carrier member on the base member, the material of the graduation carrier member having a lower temperature expansion coefficient than the material of the base member, comprising placing the graduation carrier member on the base member in a floating manner, heating the graduation carrier member and the base member to a predetermined temperature, fixing at least the end faces of the graduation carrier member by means of the fastening elements to the base member, such that the graduation carrier member is in a compressed state when cooled to normal temperature.

2. The method according to claim 1, comprising applying a graduation on the graduation carrier member at normal temperature deviating from the actual graduation in such a way that the graduation on the graduation carrier in the compressed state is the correct actual graduation.

3. The method according to claim 2, wherein the extent by which the graduation applied on the graduation carrier member at normal temperature deviates from the actual graduation is determined in accordance with the ratio of temperature expansion coefficients of the materials of the base member and the graduation carrier member and the predetermined temperature to which the embodiment of measure is heated.

* * * * *